Feb. 16, 1937.  M. SUNDERLAND  2,070,631
ROTARY INTERNAL COMBUSTION ENGINE
Filed Jan. 25, 1936   3 Sheets-Sheet 1
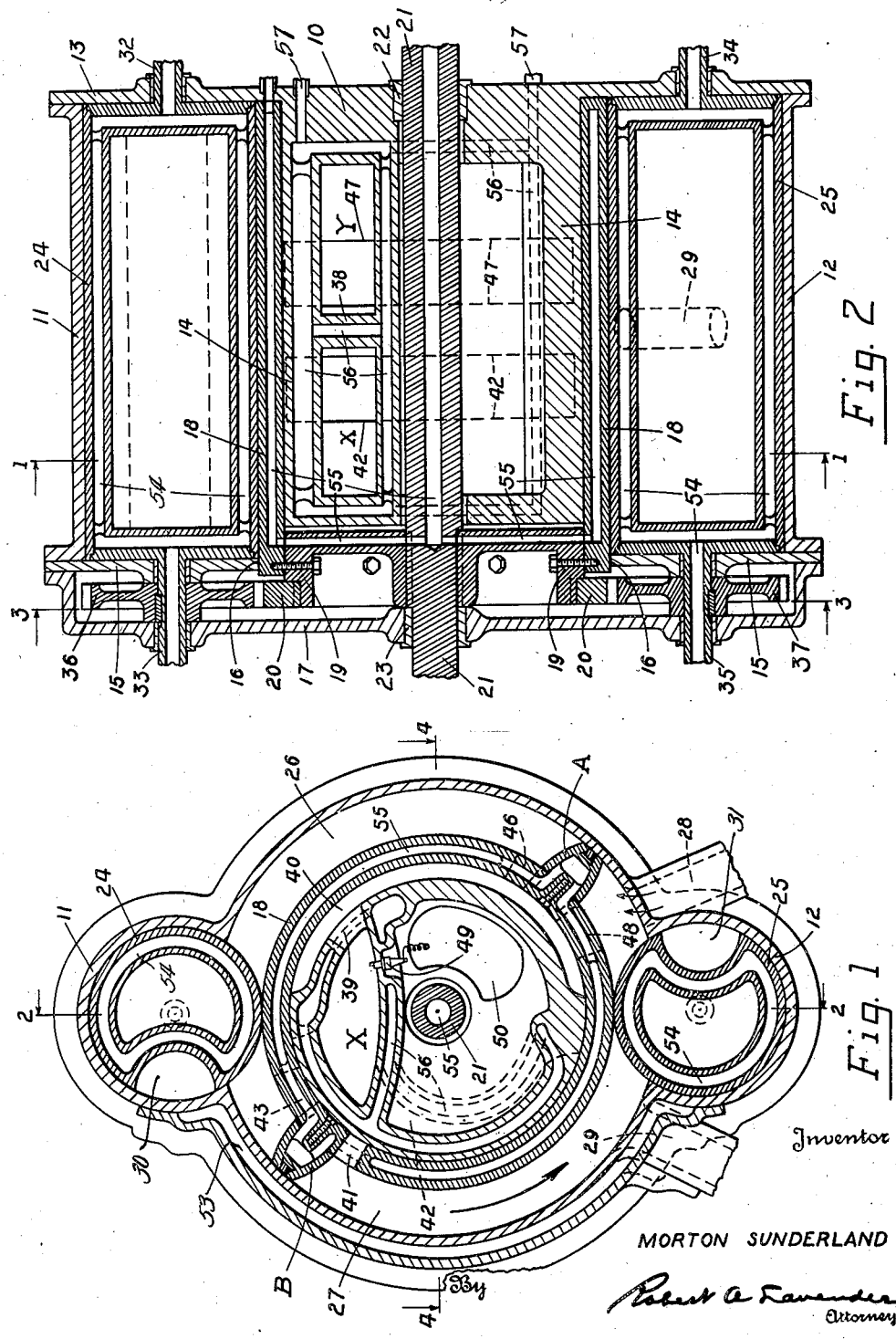
Inventor
MORTON SUNDERLAND
By Robert A. Lavender
Attorney

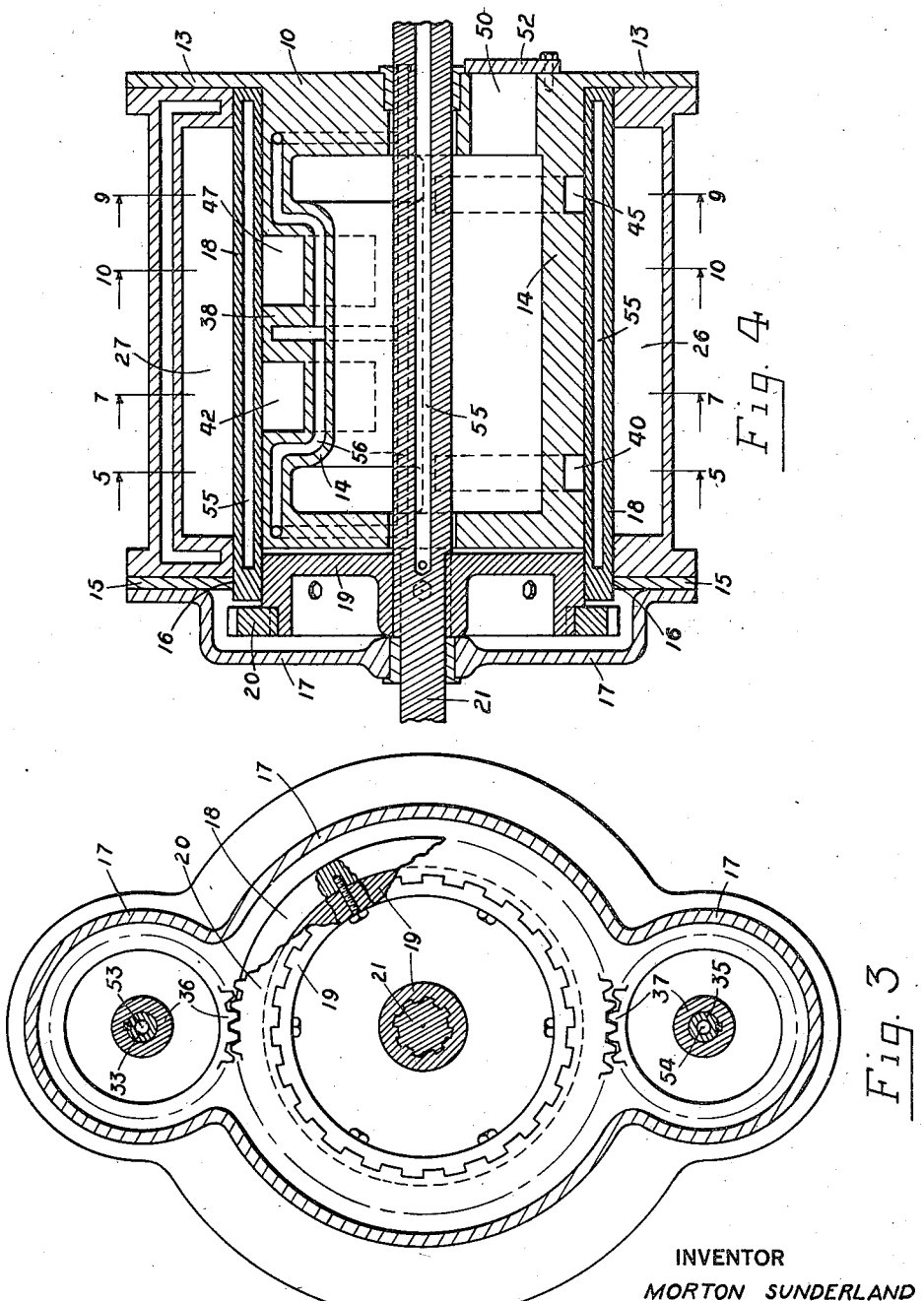

INVENTOR
MORTON SUNDERLAND
BY Robert A. Lavender
Attorney

Patented Feb. 16, 1937

2,070,631

UNITED STATES PATENT OFFICE 2,070,631

ROTARY INTERNAL COMBUSTION ENGINE

Morton Sunderland, United States Navy

Application January 25, 1936, Serial No. 60,781

12 Claims. (Cl. 123—13)

(Granted under the act of March 3, 1883, as amended April 30, 1928; 370 O. G. 757)

This invention relates to internal combustion engines and it has a particular relation to engines of the rotary type embodying a member rotatably mounted upon a stationary arbor and provided with a plurality of piston-vanes cooperating with a cylindrical surface for drawing in the combustible mixture, compressing the same, receiving the propelling forces of the combustions and for finally expelling the exhaust gases from the firing chamber.

The principal object of the present invention is the provision of an engine of the character described which is of improved construction and increased efficiency and in which the number of moving parts is reduced to a minimum.

More specifically, the invention contemplates the provision of a rotary internal combustion engine in which each of the several piston-vanes is driven by the firing of a charge of combustible mixture behind the vane which was previously compressed in front of the same vane and during the same individual revolution thereof.

With these and other objects in view, as well as other advantages which may be incident to the use of the improvements, the invention consists in the parts and combinations thereof hereinafter set forth and claimed, and with the understanding that the several necessary elements constituting the same may be varied in proportion and arrangement without departing from the nature and scope of the invention, as defined in the appended claims.

In order to make the invention more clearly understood, there are shown in the accompanying drawings means for carrying the invention into practical use, without limiting the improvements in their useful application to the particular construction, which, for the purpose of explanation, have been made the subject of illustration.

In the accompanying drawings:

Fig. 1 is a vertical transverse sectional view taken on line 1—1 of Fig. 2, through an engine constructed in accordance with the invention;

Fig. 2 is a vertical longitudinal sectional view taken on line 2—2 of Fig. 1;

Fig. 3 is a vertical transverse sectional view taken on line 3—3 of Fig. 2;

Fig. 4 is a horizontal transverse sectional view taken on line 4—4 of Fig. 1;

Figure 8:
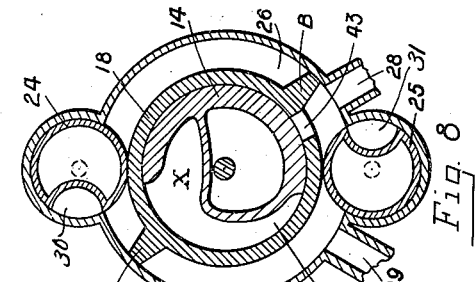
Figure 12:
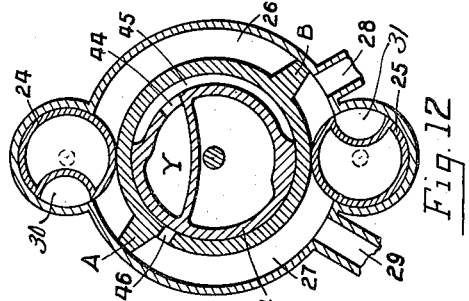
Figure 7:
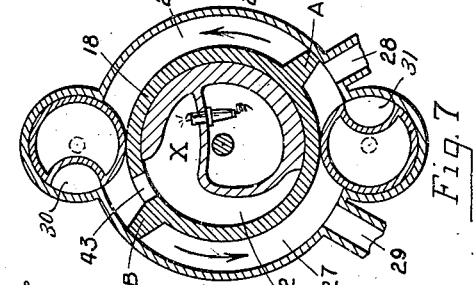
Figure 11:
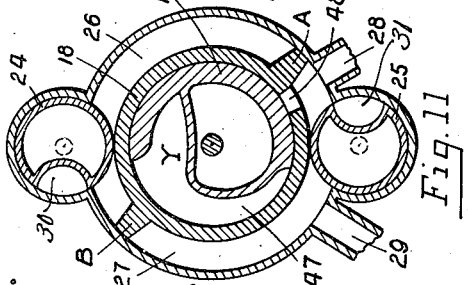
Figure 13:
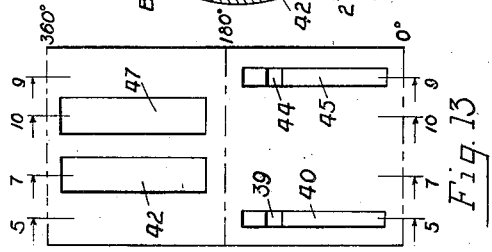
Figure 14:
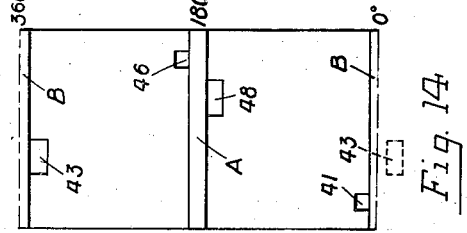
Figure 6:
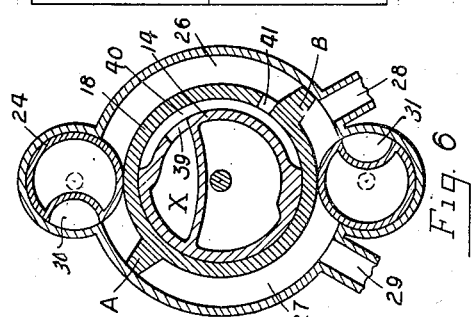
Figure 10:
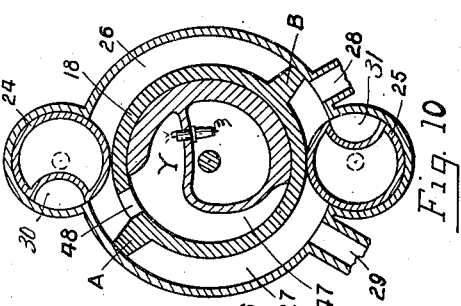
Figure 5:
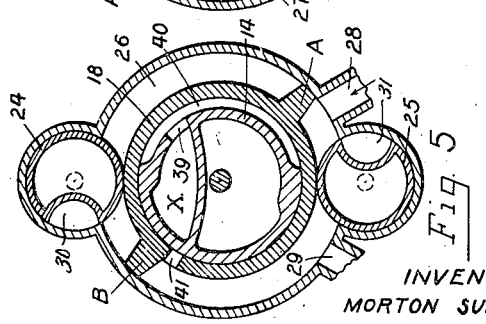
Figure 9:
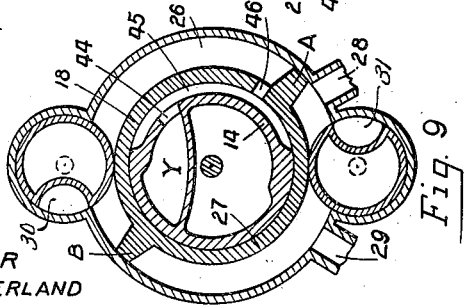

Figs. 5 and 6 are vertical diagrammatic sectional views on a reduced scale taken on line 5—5 of Figs. 4 and 13 and illustrating, respectively, the intake and compression phases of a cycle of operations;

Figs. 7 and 8 are similar views taken on line 7—7 of Figs. 4 and 13 and illustrating, respectively, the expansion and exhaust phases of the same cycle of operations;

Figs. 9 and 12 are similar views taken on line 9—9 of Figs. 4 and 13 and illustrating compression and intake operations which occur simultaneously with the intake and exhaust operations shown in Figs. 5 and 8, respectively;

Figs. 10 and 11 are similar views taken on line 10—10 of Figs. 4 and 13 and illustrating the expansion and exhaust operations which occur simultaneously with the compression and expansion operations shown in Figs. 6 and 7, respectively;

Fig. 13 is a diagrammatic development on a reduced scale of the stationary arbor and illustrating the location of the several inlet and outlet passages communicating with the two expansion chambers; and Fig. 14 is a similar view of the rotor or power sleeve and illustrating the location of the several inlet and outlet ports which cooperate with the passages shown in Fig. 13.

Referring to the drawings, a rotary engine embodying the present invention is shown as comprising a cylindrical casing or stator 10 having diametrically disposed semi-cylindrical upper and lower abutment housings 11 and 12 communicating with the interior thereof. One end of the casing 10 and the adjacent ends of the abutment housings 11 and 12 are closed by an end plate 13 provided with a non-rotary concentrically arranged hollow cylindrical arbor 14. The other end of the casing 10 and the adjacent ends of the abutment housings 11 and 12 are closed by an inner end plate 15 having an opening 16 therein in axial alignment with the arbor 14 and over which an outer end plate or gear housing 17 is suitably secured.

Rotatably mounted upon the stationary arbor 14 and in spaced relation to the cylindrical casing 10, is a rotary power sleeve or rotor 18 provided with a pair of radially projecting diametrically disposed piston vanes A and B which extend longitudinally of the sleeve 18 and which gas-tightly engage the interior cylindrical surface of the casing 10. One end of the sleeve 18 extends through the opening 16 in the plate 15 and is secured to the hub portion 19 of a gear 20 fixed to a main shaft 21 which extends through the arbor 14 and is journaled at its ends in bearings 22 and 23 provided in the end plates 13 and 17, respectively.

Rotatably mounted within the housings 11 and 12 are upper and lower cylindrical abutments 24 and 25, respectively, of hollow construction, which are disposed in close contact with the circumferential surface of the rotatable sleeve 18 so as to separate the space between the sleeve and casing 10 into oppositely disposed chambers 26 and 27, the former communicating with an intake passage 28, and the latter communicating with an exhaust passage 29. The abutments 24 and 25 are formed with longitudinally extending recesses 30 and 31 respectively which register with the piston-vanes A and B during the rotation of the parts so as to permit of their passage from one chamber to the other and at the same time preventing leakage between the chambers 26 and 27.

The upper abutment 24 is provided with tubular stud shafts 32 and 33 which are journaled in the end plates 13, 15 and 17, and the lower abutment 25 is provided with stud shafts 34 and 35 which are also journaled in these end plates. The abutments are rotated in unison with the power sleeve 18 by means of gears 36 and 37 which are fixed to the stud shafts 33 and 35 respectively within the gear housing or outer end plate 17 for intermeshing engagement with the main drive gear 20 at diametrically disposed points. The ratio between the gear 20 and the gears 36 and 37 driven thereby is two to one, so that the abutments 24 and 25 will each be completely rotated twice for each complete rotation of the sleeve 18.

The interior of the hollow arbor 14 is divided midway of its length by a transverse wall or partition 38 into two chambers X and Y, which, at different phases of the cycle of operations function both as compression and combustion chambers. The chamber X communicates at times with the intake chamber 26 through a port 39 and passageway 40 formed in the stationary arbor 14 and a port 41 provided in the rotatable sleeve 18 (see Fig. 6), and at certain other times (see Fig. 7) this chamber communicates with the chamber 27 through a passage 42 formed in the arbor 14 and a port 43 provided in the sleeve 18. In a like manner, the chamber Y communicates at times (see Fig. 9) with the intake chamber 26 through a port 44 and passageway 45 formed in the stationary arbor 14 and a port 46 provided in the rotatable sleeve 18, and at certain other times (see Fig. 10) this chamber communicates with the chamber 27 through a passage 47 formed in the arbor 14 and a port 48 in the sleeve 18.

The chambers X and Y are each provided with the usual ignition system including spark plugs 49, access to which may be had through a hand hole 50 provided in the end wall 13 and normally closed by a cover plate 52.

The casing 11, rotary sleeve 18, stationary arbor 14 and abutments 24 and 25 are all cooled by water or other suitable media circulated through passages 53, 54, 55 and 56, respectively, provided in these members and through the several tubular shafts and pipes 57.

To describe the operation, let it be assumed that the sleeve 18 is rotating and carrying the piston-vane A upwardly at the beginning of what may be termed the present cycle, such movement of the vane A being caused by the combustion of the charge of a previous cycle in the chamber X behind vane B. This movement of the vane A draws the first charge of combustible mixture of this present cycle into the space 26 behind the vane A through the intake passageway 28 (Fig. 5) and also displaces ahead of it the charge of the next preceding cycle from this space through the port 46, passageway 45 and port 44 and compresses this charge in chamber Y (Fig. 9). The vane B, during its downward movement, scavenges the space 27 of the burned gases of a combustion charge of a still previous cycle in chamber Y.

The continued rotation of the sleeve 18 carries the piston-vane B past the lower abutment 25, at which point the port 41 in the sleeve 18 registers with the passageway 40 in the stationary arbor 14 and the vane B moving upwardly past the inlet passageway 28 displaces the first charge from the space 26 and compresses it in the chamber X (Fig. 6).

This rotary movement of the sleeve 18 also carries the piston-vane A past the upper abutment 24 at which point the port 48 in the sleeve 18 registers with the passageway 47 in the stationary arbor 14 communicating with the chamber Y at which time the charge previously compressed in this chamber is fired by the ignition system behind the vane A so as to supply the force required to compress the first charge just referred to, to scavenge the space 27 of the burned gases of the previous explosion in chamber Y and to draw the second charge of the present cycle into the space 26 behind the vane B (Fig. 10).

The continued rotation of the sleeve 18 carries the piston-vane B past the upper abutment 24 and the port 43 in the sleeve 18 into registration with the passageway 42 in the stationary arbor 14 communicating with the chamber X at which time the first charge of the present cycle just compressed in this chamber by the vane B is fired by the ignition system and exerts a force on the back side of this vane (Fig. 7).

The explosion of this first charge of the present cycle in chamber X supplies the energy required to scavenge the burned gases of the previous explosion in chamber Y, to compress the second charge of the present cycle in chamber Y ahead of vane A and to draw the first charge of the succeeding cycle into the space 26 back of this vane (Figs. 9 and 11).

The continued rotation of the sleeve 18 carries the vane A past the upper abutment 24 where it scavenges the burned gases from the space 27 resulting from the explosion of the first charge in chamber X (Fig. 8).

This movement of the vane A is caused by the explosion of the second charge of combustible mixture in chamber Y (Figs. 10 and 12).

From the foregoing it will be apparent that there are two combustions for each complete rotation of the sleeve 18, one occurring in chamber X to supply the driving force back of the piston-vane B and one occurring in chamber Y to supply the driving force back of vane A; that the combustions in these chambers occur in succession; that during a combustion in one of the chambers a charge is being compressed in the other chamber; that by the arrangement of the several ports and passages the two chambers are at all times sealed with respect to one another; and that there are two intake phases, two compression phases, two combustion phases and two scavenging phases to each complete cycle of operations, although certain phases of a particular cycle are overlapped by certain other phases of the preceding and succeeding cycles.

Also, it will be noted that a combustion occurs behind the same vane that previously compressed the charge. The number of piston-vanes may be increased in number by correspondingly increasing the number of combustion chambers and associated inlet and outlet ports. The invention may, by suitable modifications, be adapted for operation by air or steam pressure if so desired.

Oil injection valves may be substituted for the spark plugs 49 and air admitted through the intake passage 28. The engine with these changes will operate according to the Diesel principle.

Other modifications and changes in the proportions and arrangement of the parts may be made by those skilled in the art without departing from the nature and scope of the invention, as defined in the appended claims.

The invention described herein may be manufactured and used by or for the Government of the United States of America for governmental purposes without the payment of any royalty thereon or therefor.

I claim:

1. A rotary internal combustion engine comprising a cylindrical casing having a fuel inlet and an outlet for the products of combustion, a cylindrical stationary arbor disposed within said casing in concentric spaced relation thereto and having a plurality of combustion chambers therein, each of said chambers being provided with a fuel inlet passageway, a sleeve rotatably mounted on said arbor, a plurality of radially projecting longitudinally extending piston-vanes carried by said sleeve for engagement with the inner cylindrical surface of said casing, and a plurality of rotatable abutments mounted for engagement with the outer surface of said sleeve and dividing the space between said casing and said sleeve into inlet and outlet chambers, said abutments having recesses therein to permit of the passage of said piston-vanes thereby, said sleeve having inlet and outlet ports therein for establishing communication between said inlet and outlet chambers and said fuel inlet passageways at different rotary positions of said sleeve.

2. A rotary internal combustion engine comprising a cylindrical casing having a fuel inlet and an outlet for the products of combustion, a cylindrical stationary arbor disposed within said casing in concentric spaced relation thereto and having a pair of combustion chambers therein, each of said chambers being provided with a fuel inlet passageway, a sleeve rotatably mounted on said arbor, a pair of radially projecting longitudinally extending diametrically disposed piston-vanes carried by said sleeve for engagement with the inner cylindrical surface of said casing, and a pair of diametrically disposed rotatable abutments mounted for engagement with the outer surface of said sleeve and dividing the space between said casing and said sleeve into an inlet chamber and an outlet chamber, said abutments having recesses therein to permit of the passage of said piston-vanes thereby, said sleeve having inlet and outlet ports therein for establishing communication between said inlet and outlet chambers and said fuel inlet passageways at different rotary positions of said sleeve.

3. A rotary internal combustion engine comprising a cylindrical casing having a fuel inlet and an outlet for the products of combustion, a cylindrical stationary arbor disposed within said casing in concentric spaced relation thereto and having a plurality of axially spaced combustion chambers therein, each of said chambers being provided with a fuel inlet passageway, a sleeve rotatably mounted on said arbor, a plurality of radially projecting longitudinally extending piston-vanes carried by said sleeve for engagement with the inner cylindrical surface of said casing, and a plurality of rotatable abutments mounted for engagement with the outer surface of said sleeve and dividing the space between said casing and said sleeve into inlet and outlet chambers, said abutments having recesses therein to permit of the passage of said piston-vanes thereby, said sleeve having laterally and circumferentially spaced inlet and outlet ports therein for establishing communication between said inlet and outlet chambers and said fuel inlet passageways at different rotary positions of said sleeve.

4. A rotary internal combustion engine comprising a cylindrical casing having a fuel inlet and an outlet for the products of combustion, a cylindrical stationary arbor disposed within said casing in concentric spaced relation thereto and having a plurality of combustion chambers therein, each of said chambers being provided with a fuel inlet passageway, a sleeve rotatably mounted on said arbor, a plurality of radially projecting longitudinally extending diametrically disposed piston-vanes carried by said sleeve for engagement with the inner cylindrical surface of said casing, and a plurality of diametrically disposed rotatable abutments mounted for engagement with the outer surface of said sleeve and dividing the space between said casing and said sleeve into inlet and outlet chambers, said abutments having recesses therein to permit of the passage of said piston-vanes thereby, said sleeve having inlet ports therein, one located in advance of one of said vanes for establishing communication between said inlet chamber and the fuel inlet passageway of one of said combustion chambers, and another of said inlet ports being located in advance of another of said vanes for establishing communication between said inlet chamber and the fuel inlet passageway of another of said combustion chambers, said sleeve also having outlet ports therein, one located to the rear of one of said vanes for establishing communication between one of said combustion chambers and outlet chamber and another of said outlet ports being located to the rear of another of said vanes for establishing communication between another of said combustion chambers and said outlet chamber.

5. A rotary internal combustion engine comprising a cylindrical casing having a fuel inlet and an outlet for the products of combustion, a cylindrical stationary arbor disposed within said casing in concentric spaced relation thereto and having a pair of combustion chambers therein, each of said chambers being provided with a fuel inlet passageway, a sleeve rotatably mounted on said arbor, a pair of radially projecting longitudinally extending diametrically disposed piston-vanes carried by said sleeve for engagement with the inner cylindrical surface of said casing, and a pair of diametrically disposed rotatable abutments mounted for engagement with the outer surface of said sleeve and dividing the space between said casing and said sleeve into an inlet chamber and an outlet chamber, said abutments having recesses therein to permit of the passage of said piston-vanes thereby, said sleeve having a pair of inlet ports therein, one located in advance of one of said vanes for establishing communication between said inlet chamber and the fuel inlet passageway of one of said combustion chambers, and the other of said inlet ports being located in advance of the other of said vanes for establishing communication between said inlet chamber and the fuel inlet passageway of the other of said combustion chambers, said sleeve also having a pair of outlet ports therein, one located to the rear of one of said vanes for establishing communication between one of said combustion chambers and said outlet chamber and the other of said outlet ports being located to the rear of the other of said vanes for establishing communication between the other of said combustion chambers and said outlet chamber.

6. A rotary combustion engine according to claim 4 wherein the combustion chambers and inlet and outlet ports are axially spaced.

7. A rotary internal combustion engine comprising a cylindrical casing having a fuel inlet and an outlet for the products of combustion, a cylindrical stationary arbor disposed within said casing in concentric spaced relation thereto and having a plurality of combustion chambers therein, each of said chambers being provided with a fuel inlet passageway, a sleeve rotatably mounted on said arbor, a plurality of radially projecting longitudinally extending diametrically disposed piston-vanes carried by said sleeve for engagement with the inner cylindrical surface of said casing, and a plurality of diametrically disposed rotatable abutments mounted for engagement with the outer surface of said sleeve and dividing the space between said casing and said sleeve into inlet and outlet chambers, said abutments having recesses therein to permit of the passage of said piston-vanes thereby, said sleeve having inlet ports therein, one located in advance of one of said vanes for establishing communication between said inlet chamber and the fuel inlet passageway of one of said combustion chambers, and another of said inlet ports being located in advance of another of said vanes for establishing communication between said inlet chamber and the fuel inlet passageway of another of said combustion chambers, said sleeve also having outlet ports therein, one located to the rear of one of said vanes for establishing communication between one of said combustion chambers and said outlet chamber and another of said outlet ports being located to the rear of another of said vanes for establishing communication between another of said combustion chambers and said outlet chamber, said last-mentioned inlet and outlet ports being offset circumferentially with respect to one another so as to establish communication between said combustion chambers and said inlet and outlet chambers alternately.

8. A rotary combustion engine according to claim 5 wherein the last-mentioned inlet and outlet ports are offset circumferentially with respect to one another so as to establish communication between the combustion chambers and the inlet and outlet chambers alternately.

9. A rotary combustion engine according to claim 7 wherein the combustion chambers and the last-mentioned inlet and outlet ports are axially spaced.

10. A rotary internal combustion engine comprising a cylindrical casing having a fuel inlet and an outlet for the products of combustion, a cylindrical stationary arbor disposed within said casing in concentric spaced relation thereto and having a plurality of combustion chambers disposed in axially spaced relation therein, each of said chambers being provided with a fuel inlet passageway, a sleeve rotatably mounted on said arbor, a plurality of radially projecting longitudinally extending diametrically disposed piston-vanes carried by said sleeve for engagement with the inner cylindrical surface of said casing, and a plurality of diametrically disposed rotatable abutments mounted for engagement with the outer surface of said sleeve and dividing the space between said casing and said sleeve into inlet and outlet chambers, said abutments having recesses therein to permit of the passage of said piston-vanes thereby, said sleeve having inlet ports therein, one located in advance of one of said vanes for establishing communication between said inlet chamber and the fuel inlet passageway of one of said combustion chambers, and another of said inlet ports being located in advance of another of said vanes for establishing communication between said inlet chamber and the fuel inlet passageway of another of said combustion chambers, said sleeve also have outlet ports therein, one located to the rear of one of said vanes for establishing communication between one of said combustion chambers and said outlet chamber and another of said outlet ports being located to the rear of another of said vanes for establishing communication between another of said combustion chambers and said outlet chamber, said last-mentioned inlet and outlet ports being offset circumferentially and axially with respect to one another so as to establish communication between said combustion chambers and said inlet and outlet chambers alternately.

11. A rotary combustion engine according to claim 5 wherein the combustion chambers are axially spaced and the last-mentioned inlet and outlet ports are offset circumferentially and axially with respect to one another so as to establish communication between the combustion chambers and the inlet and outlet chambers alternately.

12. A rotary combustion engine according to claim 10 wherein the combustion chambers and the last mentioned inlet and outlet ports are axially spaced.

MORTON SUNDERLAND.